United States Patent
Oyamada et al.

(10) Patent No.: US 9,610,688 B2
(45) Date of Patent: Apr. 4, 2017

(54) ROBOT PROGRAM GENERATION APPARATUS GENERATING ROBOT PROGRAM FOR REDUCING JERKS OF JOINTS OF ROBOT

(71) Applicant: FANUC Corporation, Yamanashi (JP)

(72) Inventors: Masahiro Oyamada, Yamanashi (JP); Yoshiharu Nagatsuka, Yamanashi (JP); Yanxue Liang, Yamanashi (JP); Toshiya Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/822,293

(22) Filed: Aug. 10, 2015

(65) Prior Publication Data
US 2016/0039090 A1 Feb. 11, 2016

(30) Foreign Application Priority Data
Aug. 11, 2014 (JP) ................................. 2014-163796

(51) Int. Cl.
*B25J 9/16* (2006.01)
*B25J 9/22* (2006.01)
(Continued)

(52) U.S. Cl.
CPC ............. *B25J 9/163* (2013.01); *B25J 9/1633* (2013.01); *G05B 2219/40053* (2013.01);
(Continued)

(58) Field of Classification Search
CPC ........ B25J 9/163; B25J 9/1633; B25J 9/1644; G05B 2219/40053; G05B 2219/40517;
(Continued)

(56) References Cited

U.S. PATENT DOCUMENTS

| 6,046,564 A | 4/2000 | Kim | |
|---|---|---|---|
| 2001/0056324 A1* | 12/2001 | Miyazawa | B25J 9/1651 318/568.11 |

(Continued)

FOREIGN PATENT DOCUMENTS

| JP | 2-304601 A | 12/1990 |
|---|---|---|
| JP | H11-249724 A | 9/1999 |

(Continued)

*Primary Examiner* — Dale Moyer
(74) *Attorney, Agent, or Firm* — Hauptman Ham, LLP

(57) ABSTRACT

A robot program generation apparatus includes an allowable jerk value setting unit for setting allowable jerk values to joints of a robot, a joint information calculation unit for simulating execution of a robot program in a virtual space and calculating positions and jerks of the joints in association with time, a jerks determination unit for determining whether or not the calculated jerk is an excess jerk exceeding the allowable jerk values, a joint information identification unit for identifying the joints and positions of the joints in which the excess jerks are generated, and a robot program adjustment unit for adjusting the robot program by modifying a teaching position within the neighborhood of the positions of the joints in which the excess jerks are generated so that the jerks of the identified joints become equal to or smaller than the allowable jerk values.

6 Claims, 8 Drawing Sheets

(51) Int. Cl.
  *G05B 19/416* (2006.01)
  *G05B 19/42* (2006.01)
(52) U.S. Cl.
  CPC .......... *G05B 2219/40454* (2013.01); *G05B 2219/40517* (2013.01); *Y10S 901/03* (2013.01); *Y10S 901/28* (2013.01)
(58) Field of Classification Search
  CPC  G05B 2219/41408; G05B 2219/40519; Y10S 901/03; Y10S 901/28
  See application file for complete search history.

(56) References Cited

U.S. PATENT DOCUMENTS

| | | | |
|---|---|---|---|
| 2004/0206735 A1* | 10/2004 | Okuda | B23K 26/0884 219/121.78 |
| 2009/0102411 A1* | 4/2009 | Miller | G05B 19/416 318/573 |
| 2014/0012419 A1* | 1/2014 | Nakajima | B25J 9/1633 700/261 |
| 2015/0025684 A1* | 1/2015 | Negishi | B25J 9/1664 700/261 |

FOREIGN PATENT DOCUMENTS

| | | |
|---|---|---|
| JP | 2003-241811 A | 8/2003 |
| JP | 2007-136671 A | 6/2007 |
| JP | 2008-178934 A | 8/2008 |
| JP | 2009-43165 A | 2/2009 |
| JP | 2010-137292 A | 6/2010 |
| JP | 2012-232410 A | 11/2012 |
| JP | 2014-14876 A | 1/2014 |
| JP | 2014-24162 A | 2/2014 |

* cited by examiner

ROBOT PROGRAM GENERATION APPARATUS GENERATING ROBOT PROGRAM FOR REDUCING JERKS OF JOINTS OF ROBOT

RELATED APPLICATIONS

The present application claims priority to Japanese Application Number 2014-163796, filed Aug. 11, 2014, the disclosure of which is hereby incorporated by reference herein in its entirety.

BACKGROUND ART

1. Field of the Invention

The present invention relates to a robot program generation apparatus which generates a robot program for operating a robot.

2. Description of the Related Art

In a robot system used for conveying an object by a robot, it is desirable to operate the robot in a high speed to enhance a processing efficiency. However, if the speed of motions of the robot is simply increased, there is a risk of causing damage to an object when the robot grips or releases the object. There is also a risk of the robot dropping the object in the middle of conveyance. Therefore, when the object is damaged or dropped, an operator needs to modify a robot program.

For example, a known method for a trajectory planning of industrial robots uses a low-pass filter when performing interpolation of a speed profile or the like, in order to smooth an input profile and reduce changes in jerk, thereby smoothing motions of robots (see JP 2003-241811 A and JP H11-249724 A).

However, even if motions of a robot are smoothed by adjusting the interpolation path according to such above methods, it is not always enough to suppress the vibration of the robot while the motions are in high speed. Thus, an operator would modify a robot program through trial and error. Therefore, there is a need for a technique which can more easily and reliably reduce jerks which are one of causes of the vibration.

SUMMARY OF THE INVENTION

According to a first aspect of the present invention, there is provided a robot program generation apparatus configured to generate a robot program for operating a robot including a plurality of joints, the robot program generation apparatus comprising: an allowable jerk value setting unit configured to set allowable jerk values to the joints of the robot; a joint information calculation unit configured to simulate execution of a robot program in a virtual space and calculate positions and jerks of the joints in association with time; a jerk check unit configured to determine whether or not the jerks calculated by the joint information calculation unit are excess jerks which exceed the allowable values; a joint information identification unit configured to identify joints and positions of the joints in which the excess jerks are generated; and a robot program adjustment unit configured to adjust the robot program by modifying a teaching position within the neighborhood of the positions of the joints in which the excess jerks are generated so that the jerks of the joints identified by the joint information identification unit become equal to or smaller than the allowable values.

According to a second aspect of the present invention, in the robot program generation apparatus according to the first aspect, the robot program adjustment unit is configured to modify the teaching position so as to match with a grid point in which jerks become the smallest among grid points formed by dividing a space within the neighborhood of the positions of the joints in which the excess jerks are generated, according to a computational grid.

According to a third aspect of the present invention, in the robot program generation apparatus according to the first aspect, the robot program adjustment unit is configured to modify the teaching position so as to reduce a change amount of jerks with respect to time in the joints in which the excess jerks are generated.

According to a fourth aspect of the present invention, the robot program generation apparatus according to any one of the first to third aspects further comprises an interference check unit configured to arrange a three-dimensional model of the robot and a three-dimensional model of a physical object existing in surroundings of the robot in the virtual space and determine whether or not the robot and the physical object interfere with each other when the simulation is performed, wherein the robot program adjustment unit is configured to modify the teaching position so as not to cause interference between the robot and the physical object.

According to a fifth aspect of the present invention, the robot program generation apparatus according to any one of the first to fourth aspects further comprises a motion time calculation unit configured to calculate a motion time required to execute the robot program, wherein the robot program adjustment unit is configured to modify the teaching position so as to shorten the motion time.

According to a sixth aspect of the present invention, the robot program generation apparatus according to any one of the first to fifth aspects further comprises: an overwrite determination unit configured to determine whether or not a robot program can be overwritten in the robot; and a program transfer unit configured to transfer a robot program generated by the robot program generation apparatus to the robot, wherein the program transfer unit is configured to transfer the robot program to the robot when the overwrite determination unit determines that the robot program can be overwritten.

These and other objects, features and advantages of the present invention will become more apparent in light of the detailed description of exemplary embodiments thereof as illustrated in the drawings.

DETAILED DESCRIPTION OF THE INVENTION

Figure 1:
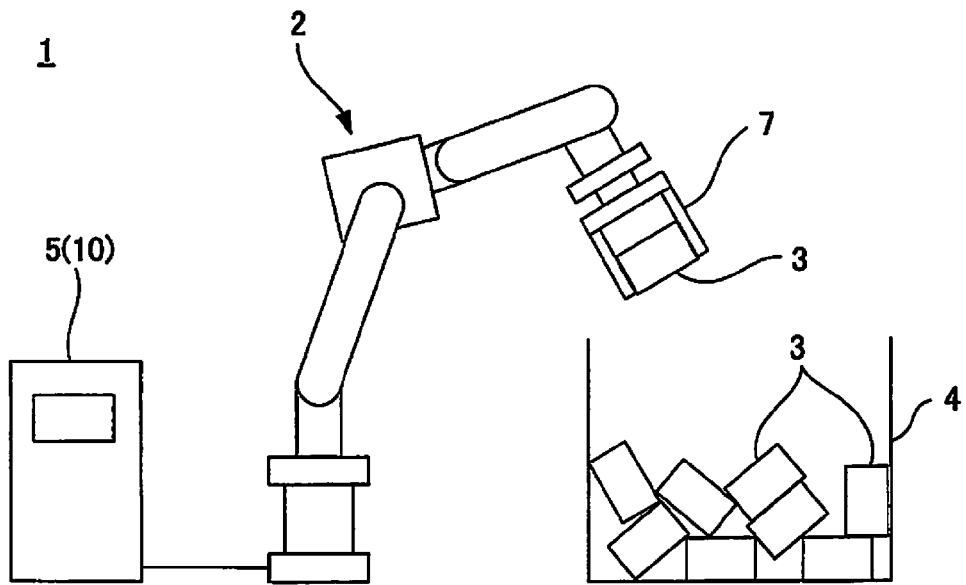
FIG. 1 illustrates a configuration of a robot system including a robot program generation apparatus.

Embodiments of the present invention will be described in detail below with reference to the attached drawings. The sizes of illustrated components may be modified as necessary to facilitate understanding of the present invention. Same or corresponding components are denoted by the same reference numerals.

FIG. 1 illustrates an exemplary configuration of a robot system 1. The robot system 1 is used, for example, to successively convey a plurality of objects 3 (for example, workpieces) to a predetermined position using a robot 2. The robot 2 is, for example, a vertical articulated robot provided with a hand 7 at a tip end of an arm. The objects 3 are randomly heaped in, for example, a container 4. The objects 3 are successively held by the hand 7 of the robot 2 and taken out of the container 4. The robot system 1 also includes a computer 5 for controlling a servomotor which drives a driving shaft of each joint of the robot 2.

The computer 5 functions online as a control apparatus which controls the robot 2 in cooperation with a visual sensor (not illustrated) used to detect a position and a attitude of the object 3. The computer 5 may also function as a control apparatus of the visual sensor and as an image processing apparatus which processes an image captured by a camera. Further, the computer 5 functions offline as a robot program generation apparatus 10 which simulates a motion of the robot 2 in a virtual space to generate a robot program. The computer 5 is a digital computer provided with a central processing unit (CPU), a read-only memory (ROM), a random access memory (RAM), and an interface or the like, which are connected with each other by a bus. The interface transfers and receives data and signals to and from an external apparatus. A monitor, such as a liquid crystal display, an input device, such as a mouse and a keyboard, and other external apparatuses may be connected to the computer 5. The robot program generation apparatus 10 which generates a robot program according to one embodiment of the present invention will be described below.

Figure 2:
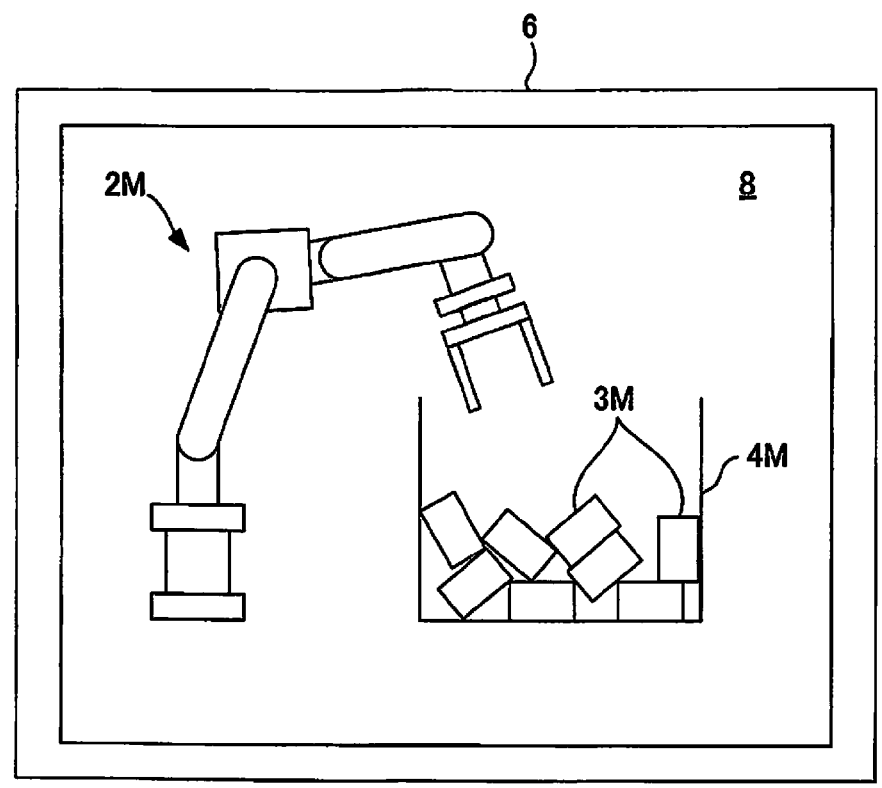
FIG. 2 is an exemplary display of a robot model arranged in a virtual space.

As described above, the robot program generation apparatus 10 has the function of simulating a motion of the robot 2 in a virtual space. When executing simulation, the robot program generation apparatus 10 arranges shape models which three-dimensionally express the respective relating components in a virtual space. FIG. 2 is an example of a virtual space 8 displayed on a monitor 6 connected to the robot program generation apparatus 10. In the virtual space 8, a robot model 2M, object models 3M, and a container model 4M which respectively express the robot 2, the objects 3, and the container 4 as three-dimensional models are arranged. An operator can check a positional relationship between the respective models in the three-dimensional space by operating the input device to change a point of view.

A model used in the simulation is an approximation model with necessary accuracy in dynamics and vibration. The approximation model may be a rigid body model in which only a mechanism is considered, or an elasto-plastic model in which a load on a hand, deflection of a mechanism, and an action of gravity in addition to the mechanism are considered. Further, the approximation model may be applicable to a robot system which obtains a position of the tip end of the hand of the robot from the joints obtained by an angle sensor installed in the servomotors, and to a robot system which conversely obtains positions of the joints from a position of the tip end of the hand of the robot.

Figure 3:
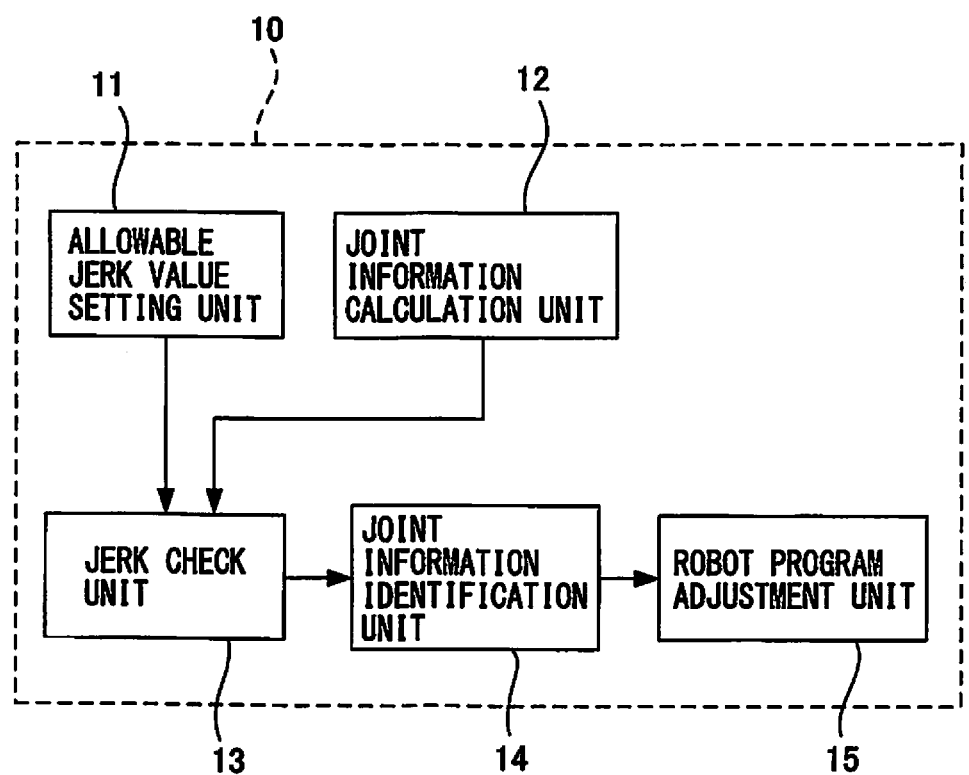
FIG. 3 is a functional block diagram of a robot program generation apparatus according to one embodiment.

FIG. 3 is a functional block diagram of the robot program generation apparatus 10. The robot program generation apparatus 10 functions, when the robot 2 is moved according to a predetermined robot program, to adjust the robot program by modifying teaching positions to the desired joints so that jerks (changes amount of accelerations per unit time) of the joints become equal to or smaller than predetermined allowable jerk values. As illustrated in FIG. 3, the robot program generation apparatus 10 includes an allowable jerk value setting unit 11, a joint information calculation unit 12, a jerk check unit 13, a joint information identification unit 14, and a robot program adjustment unit 15, as a functional configuration.

The allowable jerk value setting unit 11 sets an allowable jerk value to each joint of the robot 2. The allowable jerk value is, for example, a value specified by a manufacturer of the robot 2, such as a value written in the specifications of the robot 2. The allowable jerk value may also be obtained based on a jerk calculated when the robot is moved according to a test motion program. The jerks are calculated based on the joint positions data detected by angle sensors installed in the servomotors. The joint positions detected by the angle sensors are obtained with respect to time. The jerks are obtained by performing third-order differentiation on the joint positions with respect to time.

The jerks may be actual values obtained by actually moving the robot 2 or may be obtained as a result of simulation executed in the virtual space 8 as illustrated in FIG. 2. The motion of the robot 2 specified by a test robot program includes some handling motions of the robot 2 for a conveyance process. Various conditions may be applied as expected during actual motions. Further, the test robot program needs to be the one that does not make vibration which can cause damage to or a drop of a handled object. The allowable jerk value setting unit 11 sets a maximum value of each jerk obtained as a result of performing the test robot program, as an allowable jerk value.

The joint information calculation unit 12 calculates positions of the joints and jerks with respect to time, when a motion of the robot 2 is simulated in the virtual space. The jerks can be calculated by performing third-order differentiation on the joint positions data with respect to time.

The jerk check unit 13 determines whether or not each jerk calculated by the joint information calculation unit 12 is out of the allowable jerk value set by the allowable jerk value setting unit 11. The result of the determination by the jerk check unit 13 is sent to the joint information identification unit 14. A jerk which is out of the allowable jerk value of the corresponding joint may be hereinafter referred to as an "excess jerk" for convenience sake.

The joint information identification unit 14 identifies, when the jerk check unit 13 determines that one or more excess jerks are generated, the joints in which the one or more excess jerks are generated, as well as the positions of the joints. Excess jerk may be generated in more than one joint. The excess jerk may also be generated for more than one times in the same joint. The joint information identification unit 14 identifies the joints and positions thereof corresponding to all of the excess jerks.

The robot program adjustment unit 15 adjusts the robot program by reducing jerks of the joints so that each jerk of the joint becomes equal to or smaller than the allowable jerk value. Specifically, the robot program adjustment unit 15 modifies teaching positions within the neighborhood of the positions of the joints corresponding to the respective excess jerks identified by the joint information identification unit 14.

Figure 4:
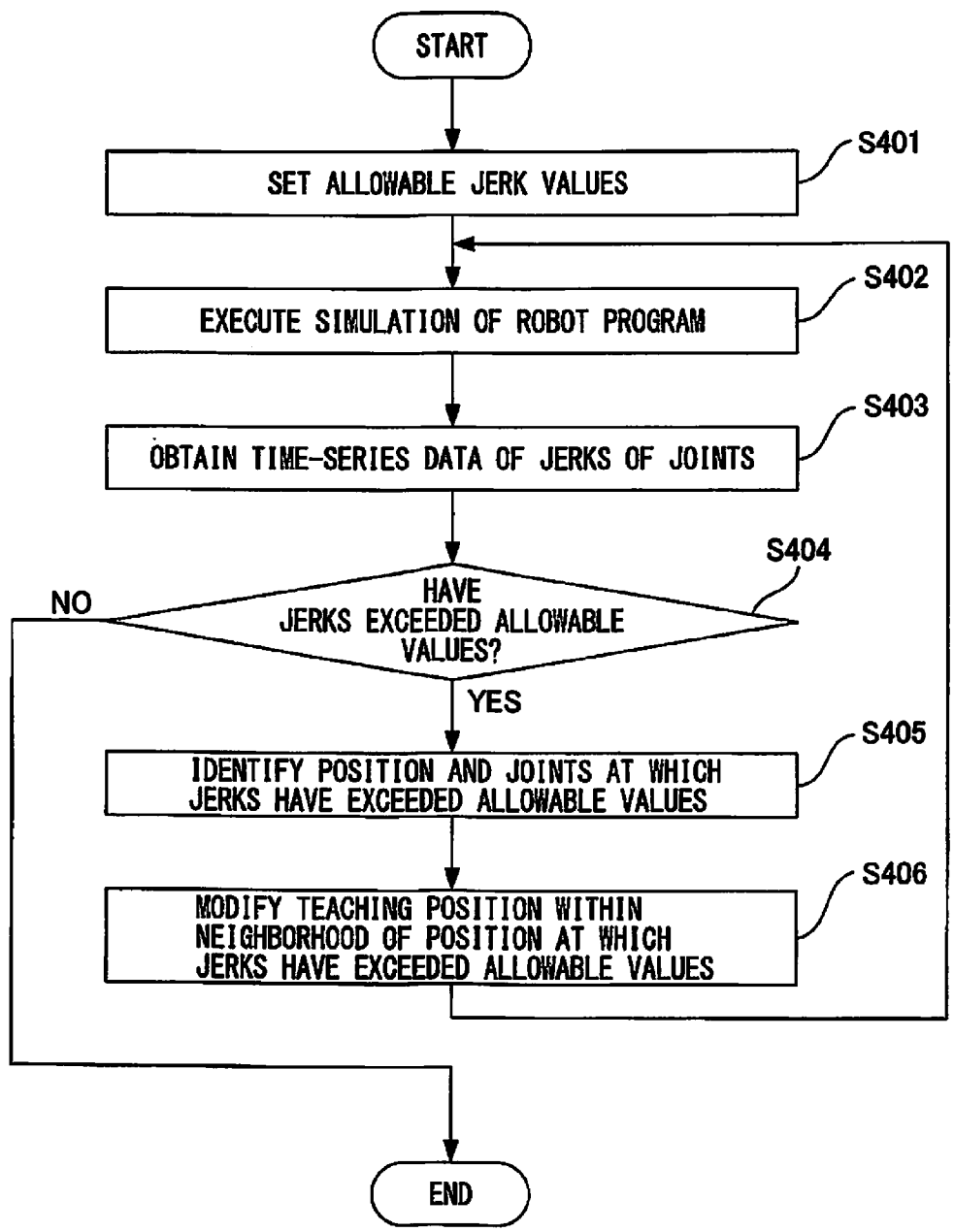
FIG. 4 is a flowchart illustrating processes executed by the robot program generation apparatus according to the embodiment.

Processes executed by the robot program generation apparatus 10 will be described with reference to a flowchart illustrated in FIG. 4. First, in step S401, the allowable jerk value setting unit 11 sets the allowable jerk values.

In step S402, the robot program generation apparatus 10 executes simulation of the robot program. In order to execute the simulation, three-dimensional models of the respective components of the robot system 1 prepared in advance, such as the robot model 2M and the object model 3M, are arranged in the virtual space 8.

In step S403, the joint information calculation unit 12 calculates the joint positions of the robot 2 with respect to time based on a simulation result of the motion program and calculates time-series data of the jerks from the joint positions with corresponding time.

In step S404, the jerk check unit 13 determines whether or not the jerks obtained in step S403 exceed the allowable jerk values which are obtained in step S401.

If the results of the determinations in step S404 is negative with respect to all jerks of all joints, it can be concluded that all jerks are sufficiently small, and no excess vibration is generated in the robot 2, so that the processing is terminated.

On the other hand, in the case where the result of the determination in step S404 is positive, i.e., one or more excess jerks are detected in at least one interval, the process proceeds to step S405, and the joint information identification unit 14 identifies the joints in which the respective excess jerks are generated, as well as the positions of the joints.

Figure 5:
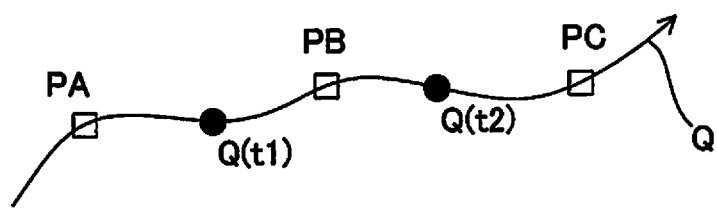
FIG. 5 illustrates teaching positions, a motion path formed according to the teaching positions, and an excess jerks generation interval.

FIG. 5 illustrates teaching positions PA, PB, and PC within the neighborhood of the interval which some excess jerks are generated, and a motion path Q created based on the teaching positions PA, PB, and PC. In FIG. 5, two black dots indicate a start point Q(t1) and an end point Q(t2) of the interval in which some excess jerks are generated continuously. Q(t1) indicates at least one jerk of a joint of all joints starts the state that the jerk is out of the allowable jerk value of the joint. Q(t2) indicates all jerks of all joints starts the state that all jerks of all joints are within the allowable jerk values. It is not necessary for a jerk value of a particular joint to be continuously out of the allowable jerk value of the joint in the interval. Even though a jerk value of a particular joint is within the allowable jerk value at a middle time in the interval, when at least one of other jerk values is out of the allowable jerk value, this means one or more excess jerks are generated. "t1" and "t2" are times corresponding to the start point and the end point of the excess jerks generation interval. White squares indicate teaching positions which are specified to the robot by the robot program and are within the neighborhood of the excess jerks generation interval. The teaching positions specified by the robot program are a group of positions including positions P1, P2, P3, . . . , PA, PB, PC, . . . , and Pn (n: natural number). When the robot program is executed, predetermined interpolation processing is executed on these teaching positions, and the motion path Q is created.

In step S406, the robot program adjustment unit 15 modifies the teaching positions within the neighborhood of the positions of the joints in which the excess jerks are generated. For example, in the case illustrated in FIG. 5, the teaching positions PB and PC are both modified, which are located within the neighborhood of the excess jerks generation interval defined between the start point Q(t1) and the end point Q(t2). A specific manner in which the teaching positions PB and PC are modified will be described below.

When modification of the robot program is completed, the process returns to step S402, and the motion of the robot 2 is simulated according to the adjusted robot program including the teaching positions modified in step S406.

Next, the manner in which the robot program adjustment unit 15 modifies the teaching positions in the robot program in step S406 is described with reference to FIGS. 6 to 8.

As described above, the robot program adjustment unit 15 modifies the teaching positions within the neighborhood of the interval in which the excess jerks are generated. According to one embodiment, the teaching position may be modified within a range of a cylindrical space which has a central axial line on the motion path Q. For example, in the case illustrated in FIG. 6, a cylindrical space TS has a central axis line on the motion path Q and a radius equal to the length of the motion path Q in the interval in which the excess jerks are generated, i.e., a distance between the start point Q(t1) and the end point Q(t2) along the motion path Q.

Figure 6:
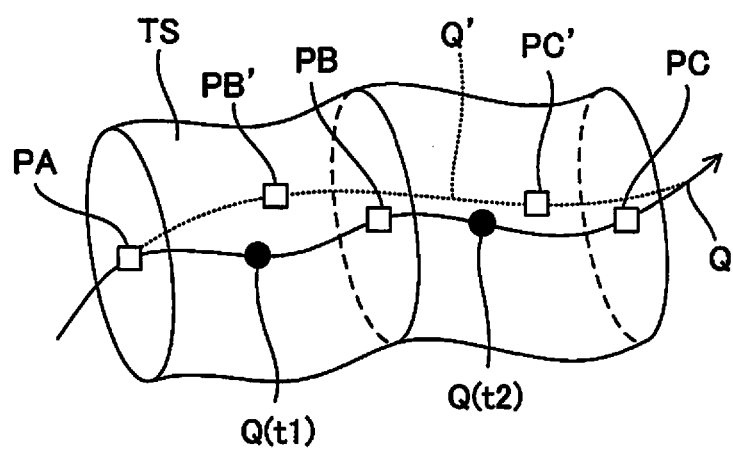
FIG. 6 illustrates a modification range of teaching positions.

The robot program adjustment unit 15 determines the modified teaching positions PB' and PC' within the range of the cylindrical space TS (see FIG. 6). In this case, teaching positions of the robot program generated by the robot program generation apparatus 10 will be the points P1, P2, P3, . . . , PA, PB', PC', . . . , and Pn, and a motion path Q' indicated by a dotted line in FIG. 6 is created according to the modified teaching positions.

Figure 7:
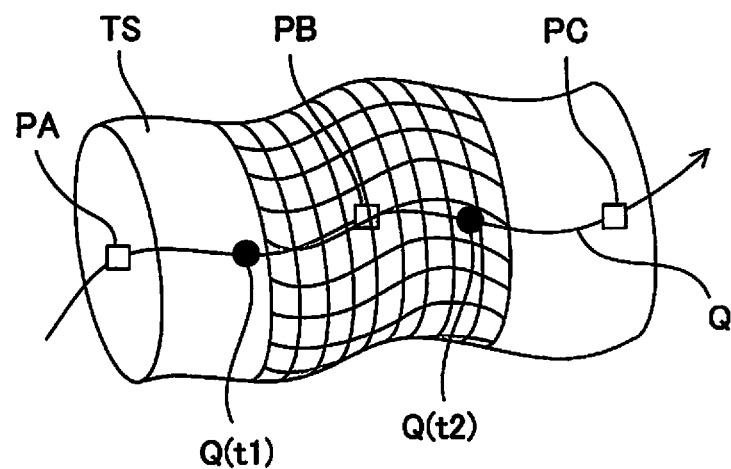
FIG. 7 illustrates the computational grid cylindrical space in FIG. 6.

According to one embodiment, a candidate of a teaching position may be obtained by dividing the cylindrical space TS according to a computational grid as illustrated in FIG. 7. In this case, modified teaching positions PB' and PC' corresponding to the teaching positions PB and PC are selected, respectively, from a finite number of computational grid points set within the cylindrical space TS.

According to one embodiment, the robot program adjustment unit 15 obtains a modified teaching position according to the following processes. First, the robot program adjustment unit 15 identifies the time-series data of the jerks corresponding to the interval in which the excess jerks are generated from the time-series data of the jerks obtained in step S403 in FIG. 4. The robot program adjustment unit 15 generates new time-series data of the jerks so as to reduce a change amount of the jerks with respect to time based on the identified time-series data of the jerks. In this process, it is ensured that a rotation amount of the joints obtained from the new time-series data of the jerks substantially matches with a rotation amount of the joints obtained from the original time-series data of the jerks. According to the present embodiment, the robot program adjustment unit 15 modifies the teaching position based on the new time-series data of the jerks obtained by reducing a change amount of the jerks with respect to time.

Figure 8:
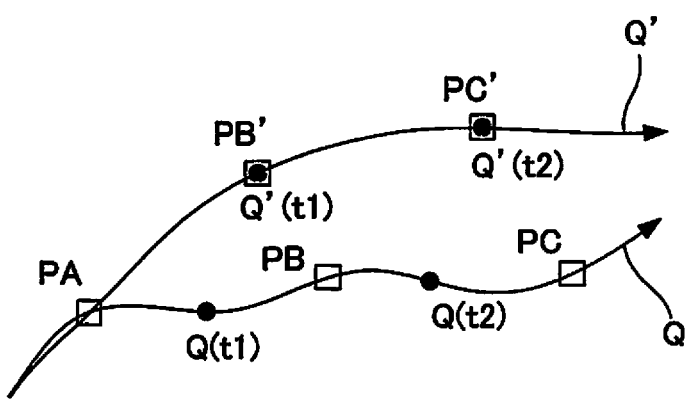
FIG. 8 illustrates the teaching positions before and after the modification.

FIG. 8 illustrates the motion path Q before the teaching position is modified and the motion path Q' created based on the new time-series data of the jerks. "Q'(t1)" indicates a position on the motion path Q' at time t1 corresponding to the start point Q(t1) of the excess jerks generation interval in the robot program before the modification. "Q'(t2)" indicates a position on the motion path Q' at time t2 corresponding to the end point Q(t2) of the excess jerks generation interval. According to the example illustrated in FIG. 8, the robot program adjustment unit 15 modifies the teaching positions PB and PC of the robot program within the neighborhood of the start point Q(t1) and the end point Q(t2), to the teaching positions PB' and PC', which are identical to "Q'(t1)" and "Q'(t2)" on the motion path Q'. A motion path created based on teaching positions including the modified teaching positions PB' and PC' depends on servo control and interpolation processing specific to the robot, and thus may not always match with the illustrated motion path Q'. However, a motion path based on the modified teaching positions is approximate to the motion path Q' obtained by reducing the time change amount of the jerks, and therefore an effect of reducing jerks can be achieved.

According to one embodiment, the robot program generation apparatus 10 may be configured to terminate the adjustment of the robot program in the case where the excess jerks are still generated even after the modification of teaching positions are repeatedly carried out by the robot program adjustment unit 15 for a predetermined number of times. When the excess jerks are not eliminated after the modification of teaching positions is repeatedly carried out, it may be reasonable that an operator should review the setting configurations other than the teaching positions in order to reduce the excess jerks.

If a plurality of excess jerks generation intervals are detected, the processing for modifying a teaching position of the robot program is executed to reduce jerks in each of the excess jerks generation intervals.

The robot program generation apparatus 10 according to the above-described embodiment has the following advantages.

(1) The robot program adjustment unit 15 adjusts a teaching position for a robot so that jerks become equal to or smaller than allowable values. Accordingly, vibration of the robot due to large jerks of the joints can be prevented.

(2) The robot program generation apparatus 10 can automatically adjust the robot program when generation of one or more excess jerks is expected. Accordingly, the jerks can be reduced without imposing a burden of trial and error on an operator.

(3) The robot program generation apparatus 10 can reduce jerks by modifying a teaching position for a robot to be operated. In other words, the robot program generation apparatus 10 can provide a jerks reduction method which does not depend on a specification of the robot. For example, parameters and interpolation processing are designed depending on each robot manufacturer. Therefore, in a robot system including a plurality of robots manufactured by different manufacturers, a jerks reduction effect cannot always be sufficiently achieved if the parameters and the interpolation processing are adjusted by the same method. In contrast, the robot program generation apparatus 10 modifies a teaching position for a robot and thus can achieve a jerks reduction effect which does not depend on the specification of the robot.

(4) According to the embodiment in which a modified teaching position is selected within a cylindrical space TS formed along the motion path Q, the modification of the teaching position can be efficiently executed.

(5) According to the embodiment in which a modified teaching position is selected from grid points formed by dividing the cylindrical space TS according to a computational grid, the teaching position can be selected from a finite number of candidates, so that the modification of the teaching position can be efficiently executed.

Figure 9:
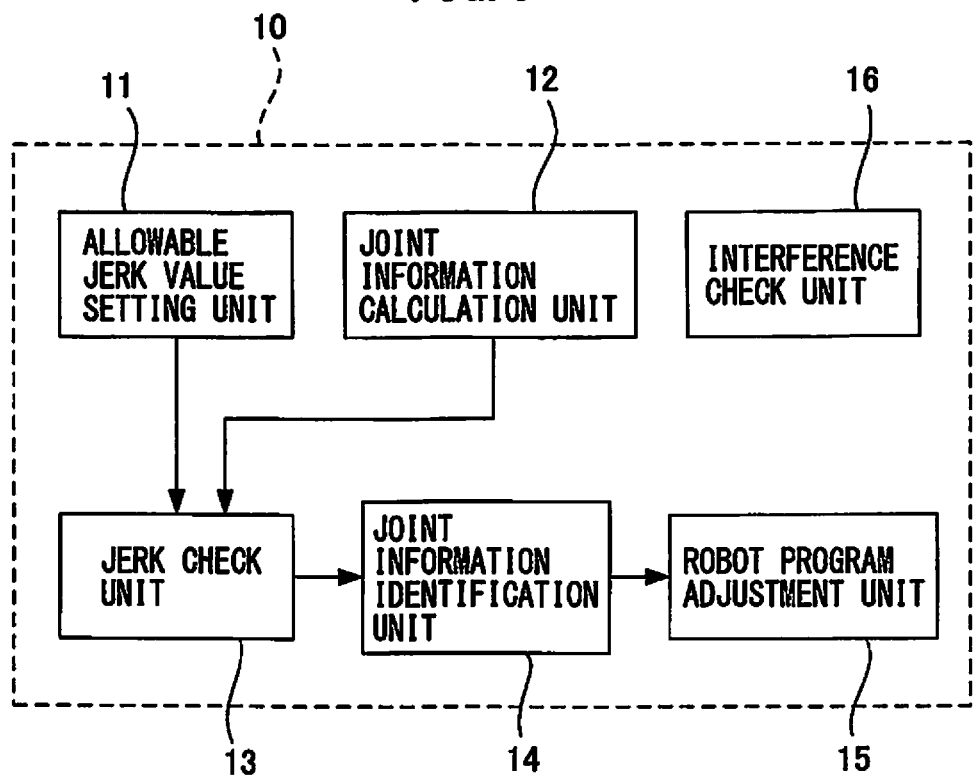
FIG. 9 is a functional block diagram of a robot program generation apparatus according to another embodiment.

FIG. 9 is a functional block diagram of a robot program generation apparatus 10 according to another embodiment. The robot program generation apparatus 10 according to the present embodiment further includes an interference check unit 16 in addition to the configuration described above with reference to FIG. 3.

The interference check unit 16 determines whether or not a robot model 2M interferes with a physical object in surroundings (for example, an object model 3M or a container model 4M) when simulating a motion of a robot 2 in a virtual space 8.

In the robot program generation apparatus 10 according to the present embodiment, the robot program adjustment unit 15 modifies a teaching position of the robot program so that the robot does not interfere with the physical object in the surroundings. Therefore, the robot program generation apparatus 10 according to the present embodiment can generate a robot program which makes jerks of the joints equal to or smaller than the corresponding allowable values and, at the same time, prevent the robot system 1 from causing interference.

Figure 10:
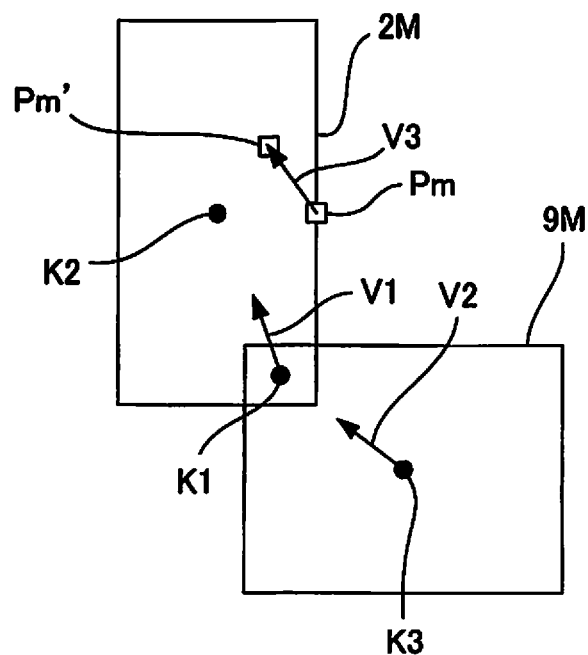
FIG. 10 illustrates a robot model and an interfering object model overlapping each other. For the sake of simplified illustration, the respective models are shown in rectangular shape.

An exemplary modification method of a teaching position when interference occurs in the robot system 1 will be described with reference to FIG. 10. When interference occurs in the virtual space 8, the robot model 2M is in contact with an interfering object model 9M at least one point, or the robot model 2M and the interfering object model 9M overlap with each other in the three-dimensional space. FIG. 10 illustrates a state in which the robot model 2M and the interfering object model 9M overlap with each other. Referring to FIG. 10, a point K1 represents a position of the center of mass of an overlapping portion of the robot model 2M and the interfering object model 9M. When the robot model 2M is in contact with the interfering object model at a point, a position of the contact point may be defined as the point K1.

A point K2 represents a position of the center of mass of the robot model 2M (a three-dimensional model of the hand of the robot 2), and a point K3 represents the center of mass of the interfering object. A vector V1 represents a unit vector oriented in a direction from the point K1 to the point K2, and a vector V2 is a unit vector oriented in a direction from the point K3 to the point K2. A vector V3 is an average of the vectors V1 and V2. When the interference check unit 16 determines that interference occurs, the robot program adjustment unit 15 modifies a teaching position Pm at which the interference occurs to a modified teaching position Pm' distant over a predetermined distance in the direction of the vector V3. In this way, the robot program generation apparatus 10 can generate the robot program which is adjusted so as to prevent the robot 2 from interfering with a physical object in the surroundings.

Figure 11:
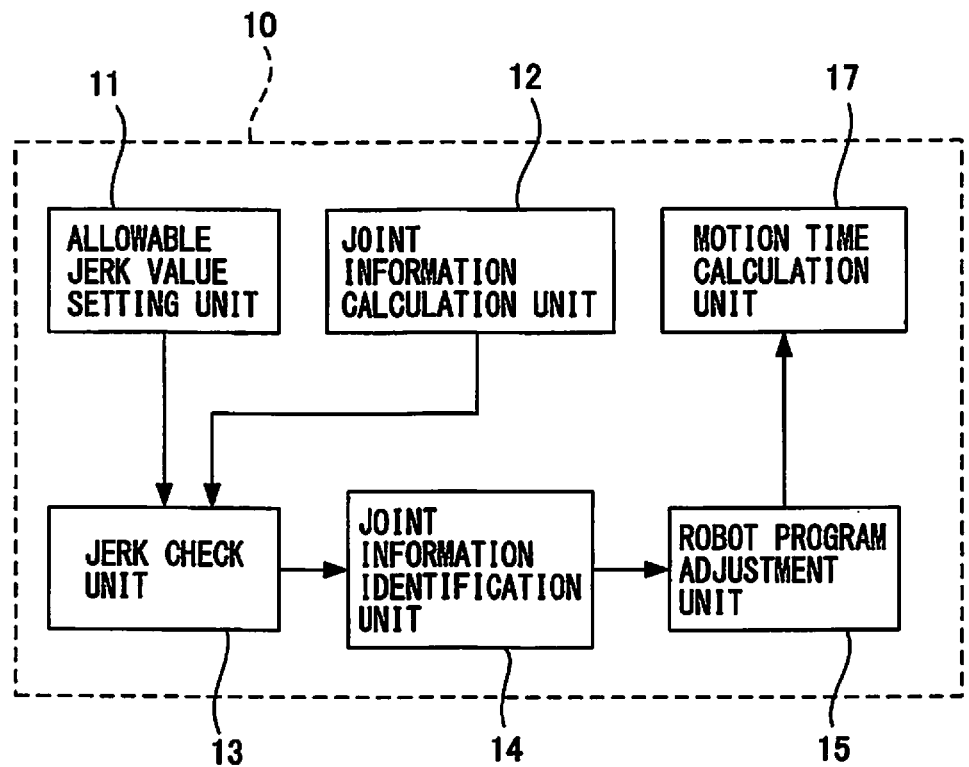
FIG. 11 is a functional block diagram of a robot program generation apparatus according to yet another embodiment.

FIG. 11 is a functional block diagram of a robot program generation apparatus 10 according to yet another embodiment. The robot program generation apparatus 10 according to the present embodiment further includes a motion time calculation unit 17 in addition to the configuration described above with reference to FIG. 3. The motion time calculation unit 17 calculates the time required to execute each robot program. The robot program generation apparatus 10 according to the present embodiment generates a robot program which requires the shortest execution time among a given number of robot programs.

For example, based on the robot program (referred to as a "first robot program" for convenience sake) including a teaching position (referred to as a "first modified teaching position" for convenience sake) which is modified to reduce jerks according to the above-described embodiment, the robot program generation apparatus 10 generates a given number of robot programs different from the first robot program, for example two robot programs. In other words, three kinds of robot programs in which a teaching position is different from each other are first generated. Then, based on the result of calculation by the motion time calculation unit 17, the robot program generation apparatus 10 selectively generates the robot program which requires the shortest time among the three robot programs.

Figure 12:
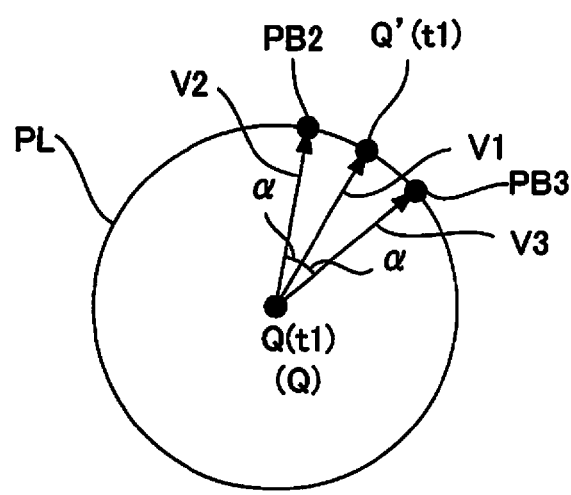
FIG. 12 illustrates an example of a second modified teaching position and a third modified teaching position according to the robot program generation apparatus in FIG. 11.

An exemplary method for obtaining teaching positions of the second robot program and the third robot program from the teaching positions of the first robot program will be described with reference to FIG. 12. Referring to FIG. 12, a vector V1 represents extending from the start point Q(t1) of the excess jerks generation interval before the modification of the teaching position to a position Q'(t1) at time t1 on a motion path created according to the first robot program. A vector V2 and a vector V3 are obtained by rotating the vector V1 by an angle α and an angle −α, respectively, about the start point Q(t1) on a plane PL perpendicular to the motion path Q before the modification.

In the second robot program, the teaching position PB (see FIG. 5) is changed to a teaching position PB2 at a position moved from the start point Q(t1) by the vector V2. Further, the teaching position PC (see FIG. 5) is changed to a teaching position PC2 at a position moved from the end point Q(t2) of the excess jerks generation interval (see FIG. 5) by the vector V2. In this way, the teaching positions specified by the second robot program become the points P1, P2, P3, . . . , PA, PB2, PC2, . . . , and Pn.

In the third robot program, the teaching position PB (see FIG. 5) is changed to a teaching position PB3 at a position moved from the start point Q(t1) by the vector V3. Further, the teaching position PC (see FIG. 5) is changed to a teaching position PC3 at a position moved from the end point Q(t2) of the excess jerks generation interval (see FIG. 5) by the vector V3. In this way, the teaching positions specified by the third robot program become the points P1, P2, P3, . . . , PA, PB3, PC3, . . . , and Pn.

When jerks generated by executing the first to third robot programs are all smaller than the allowable value, the robot program generation apparatus 10 according to the present embodiment selectively generates a robot program which requires the shortest execution time among the first robot program, the second robot program, and the third robot program.

Figure 13:
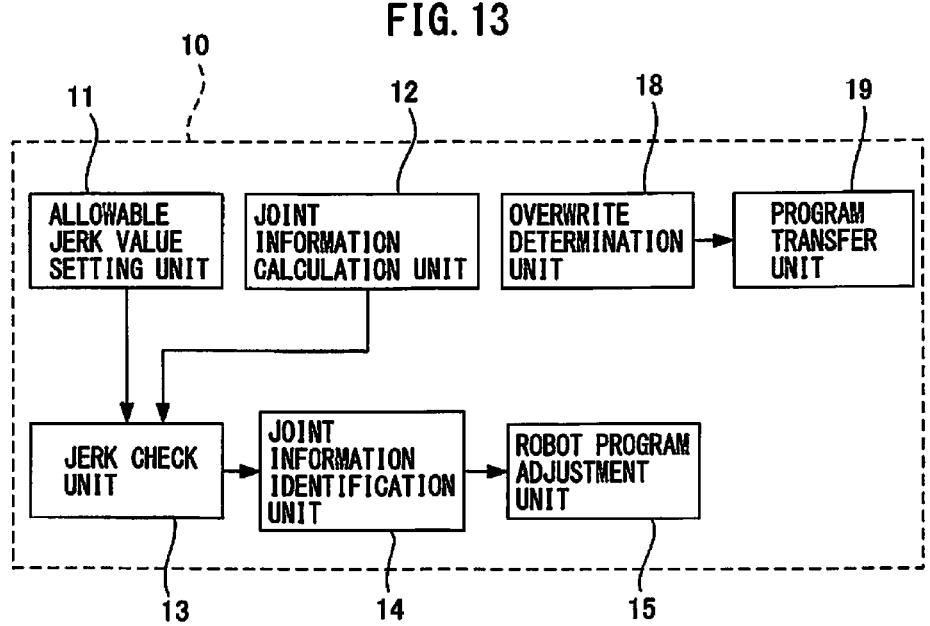
FIG. 13 is a functional block diagram of a robot program generation apparatus according to yet another embodiment.

FIG. 13 is a functional block diagram of a robot program generation apparatus 10 according to yet another embodiment. The robot program generation apparatus 10 according to the present embodiment further includes an overwrite determination unit 18 and a program transfer unit 19 in addition to the configuration described above with reference to FIG. 3. The overwrite determination unit 18 determines whether or not the robot 2 (see FIG. 1) is in a state where the robot program can be overwritten. The program transfer unit 19 transfers the robot program generated by the robot program generation apparatus 10 to the robot 2 in response to, for example, motion performed on a teaching pendant.

Figure 14:
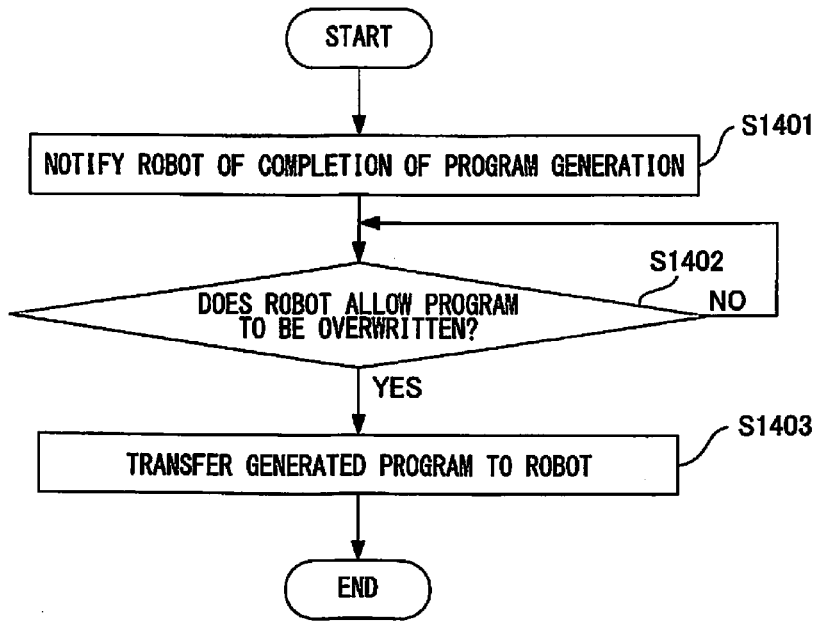
FIG. 14 is a flowchart illustrating processes for overwriting a robot program executed by the robot program generation apparatus in FIG. 12.

FIG. 14 is a flowchart illustrating processes for overwriting the robot program according to the present embodiment. The processes are started when the robot program generation apparatus 10 generates the robot program. In step S1401, the robot program generation apparatus 10 (the computer 5) notifies the robot 2 of generation of the robot program.

In step S1402, the overwrite determination unit 18 determines whether or not the robot 2 allows the robot program to be overwritten. For example, the robot program for the robot 2 can be overwritten when the robot 2 is in motion independently of the robot program generated by the robot program generation apparatus 10. When the result of the determination in step S1402 is negative, the determination in step S1402 is executed in a predetermined control cycle without proceeding to step S1403.

When the result of the determination in step S1402 is positive, the process proceeds to step S1403, and the program transfer unit 19 transfers the robot program generated by the robot program generation apparatus 10 to the robot 2. Accordingly, the robot 2 can execute a predetermined motion according to the robot program in which a teaching position is modified to reduce the jerks.

The robot program generation apparatus 10 according to the present embodiment allows the robot program to be overwritten without temporarily stopping the motion of the robot 2, depending on the situation. Accordingly, productivity can be improved.

Effect of the Invention

According to the robot program generation apparatus of the present invention, when one or more excess jerks exceeding the corresponding allowable jerk values are generated, the robot program adjustment unit modifies a teaching position for the joints in which the excess jerks are generated, in order to reduce the jerks. Accordingly, jerks causing vibration during the motion of the robot can be reduced, and thus the robot can be safely operated at a high speed.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A robot program generation apparatus configured to generate a robot program for operating a robot including a plurality of joints, the robot program generation apparatus comprising:
an allowable jerk value setting unit configured to set allowable jerk values to the joints of the robot;
a joint information calculation unit configured to simulate execution of a robot program in a virtual space and calculate positions and jerks of the joints in association with time;
a jerk check unit configured to determine whether or not the jerks calculated by the joint information calculation unit are excess jerks which exceed the allowable values;

a joint information identification unit configured to identify joints and positions of the joints in which the excess jerks are generated; and a robot program adjustment unit configured to adjust the robot program by modifying a teaching position within the neighborhood of the positions of the joints in which the excess jerks are generated so that the jerks of the joints identified by the joint information identification unit become equal to or smaller than the allowable values.

2. The robot program generation apparatus according to claim 1, wherein the robot program adjustment unit is configured to modify the teaching position so as to match with a grid point in which jerks become the smallest among grid points formed by dividing a space within the neighborhood of the positions of the joints in which the excess jerks are generated, according to a computational grid.

3. The robot program generation apparatus according to claim 1, wherein the robot program adjustment unit is configured to modify the teaching position so as to reduce a change amount of jerks with respect to time in the joints in which the excess jerks are generated.

4. The robot program generation apparatus according to claim 1, further comprising an interference check unit configured to arrange a three-dimensional model of the robot and a three-dimensional model of a physical object existing in surroundings of the robot in the virtual space and determine whether or not the robot and the physical object interfere with each other when the simulation is performed, wherein the robot program adjustment unit is configured to modify the teaching position so as not to cause interference between the robot and the physical object.

5. The robot program generation apparatus according to claim 1, further comprising a motion time calculation unit configured to calculate a motion time required to execute the robot program, wherein the robot program adjustment unit is configured to modify the teaching position so as to shorten the motion time.

6. The robot program generation apparatus according to claim 1, further comprising:

an overwrite determination unit configured to determine whether or not a robot program can be overwritten in the robot; and a program transfer unit configured to transfer a robot program generated by the robot program generation apparatus to the robot, wherein the program transfer unit is configured to transfer the robot program to the robot when the overwrite determination unit determines that the robot program can be overwritten.

\* \* \* \* \*